United States Patent [19]

Dallwig et al.

[11] Patent Number: 4,632,426
[45] Date of Patent: Dec. 30, 1986

[54] INSTALLATION FOR ADJUSTING A HINGE POINT OF A VEHICLE SAFETY BELT

[75] Inventors: Claus Dallwig, Rodental; Hans-Joachim Volk, Ebersdorf/Frohnlach, both of Fed. Rep. of Germany

[73] Assignee: Brose Fahrzeugteile GmbH & Co. KG, Coburg, Fed. Rep. of Germany

[21] Appl. No.: 610,973

[22] Filed: May 16, 1984

[30] Foreign Application Priority Data

May 17, 1983 [DE] Fed. Rep. of Germany ....... 3317957

[51] Int. Cl.$^4$ .............................................. B60R 21/10
[52] U.S. Cl. .................................... 280/808; 297/483; 74/110
[58] Field of Search ................ 280/804, 808; 297/483; 74/110

[56] References Cited

U.S. PATENT DOCUMENTS

| 696,338 | 3/1902 | Hullinger | 74/110 |
|---|---|---|---|
| 2,856,665 | 10/1958 | Gimalouski et al. | 24/635 |
| 4,050,670 | 9/1977 | Borg et al. | 74/110 |
| 4,538,832 | 9/1985 | Anderson | 280/808 |

FOREIGN PATENT DOCUMENTS

| 3007986 | 9/1981 | Fed. Rep. of Germany . |
|---|---|---|
| 3018309 | 11/1981 | Fed. Rep. of Germany . |
| 3139822 | 4/1983 | Fed. Rep. of Germany . |

Primary Examiner—John J. Love
Assistant Examiner—Kenneth R. Rice
Attorney, Agent, or Firm—Barnes & Thornburg

[57] ABSTRACT

An installation for adjusting a safety belt hinge point in a vehicle with a slide member determining the hinge point and displaceable along a rail and with a detent mechanism selectively fixing the slide member at the rail 30 in at least two detent positions; the detent mechanism includes a detent element which engages in detent apertures of the rail and is prestressed by a spring into the detent position; the detent element and the actuating handle for the actuation of the detent element which is coupled with the detent element, are displaceable in different directions and are coupled with each other by a guide element 52 providing a step-down translation. An increased prestress force on the detent element with an actuating force for the handle that remains the same, is achieved thereby together with a mechanically simple construction.

51 Claims, 8 Drawing Figures

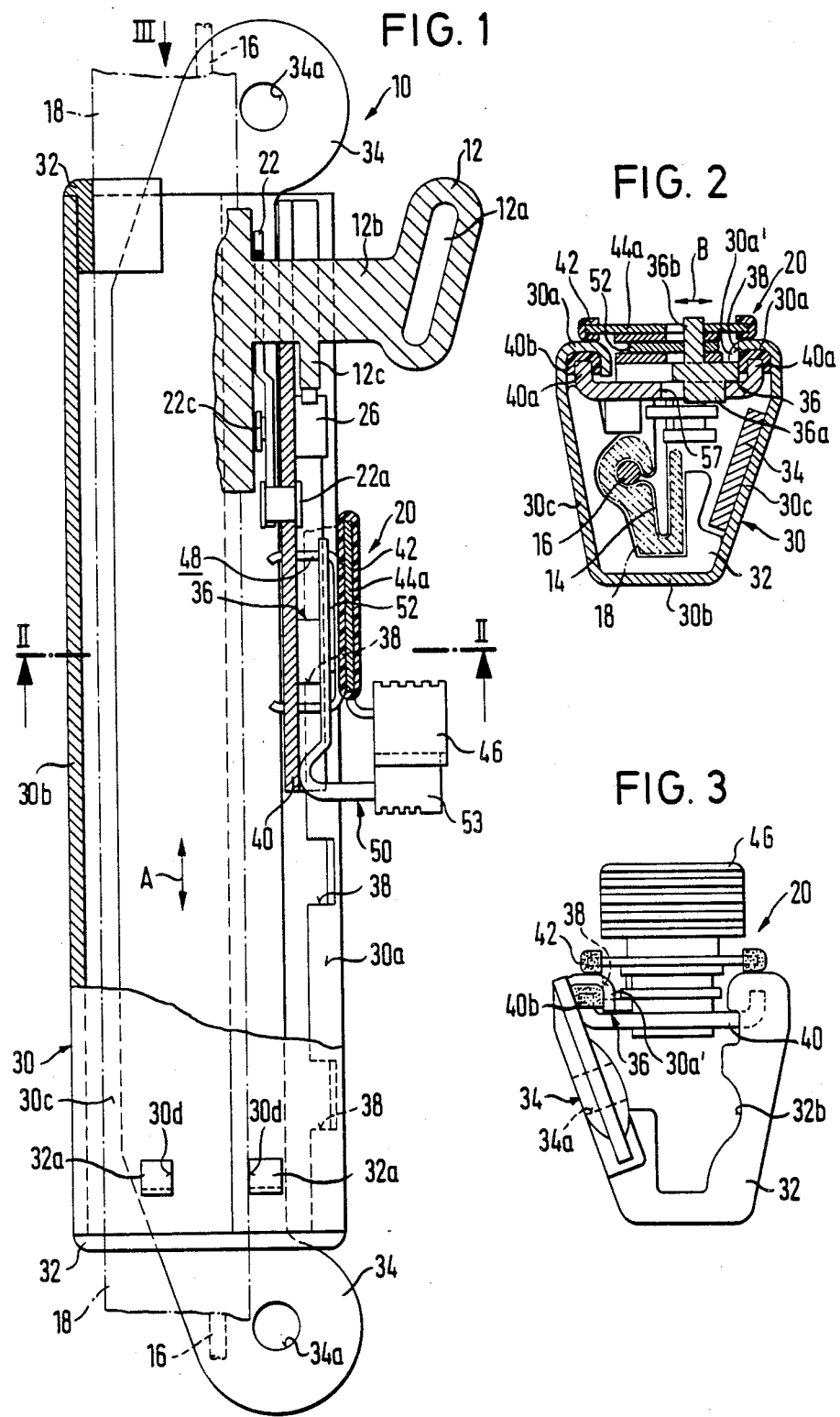

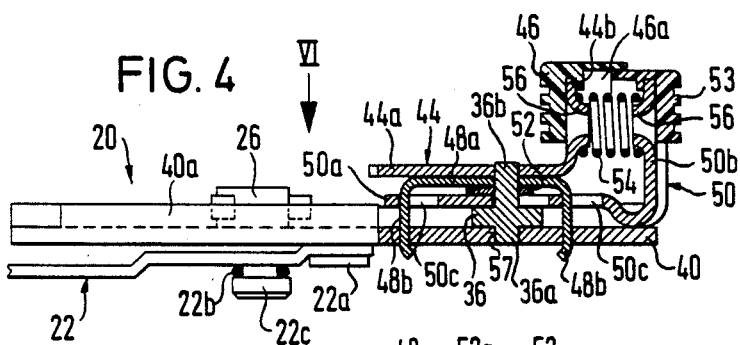
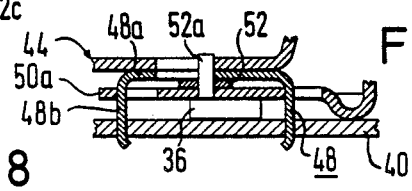
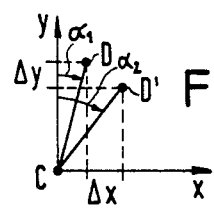
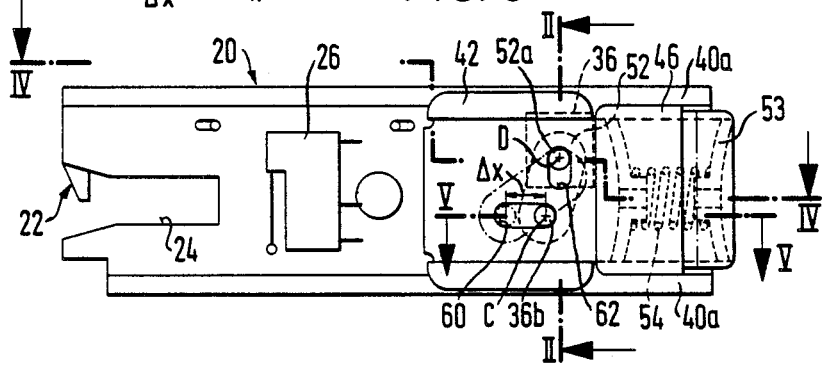
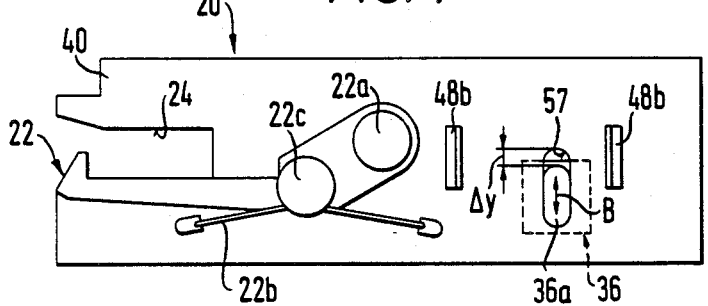

INSTALLATION FOR ADJUSTING A HINGE POINT OF A VEHICLE SAFETY BELT

The present invention relates to an installation for the adjustment of a hinge point of a safety belt in a vehicle, which includes a slide member determining the hinge point and displaceable along a rail fixed at the vehicle and a detent mechanism selectively fixing the slide member at the rail in at least two detent positions.

Such an adjusting installation enables the adaptation of the safety belt hinge point to the respective conditions in the motor vehicle so that always the optimum belt fastening position can be adjusted, which assures to the driver a minimum impairment by the belt during the drive and at the same time greatest possible safety in case of an accident. The rail will generally extend essentially vertically (along the B column of a motor vehicle) so that the hinge point can be adjusted in its height in adaptation to differently tall vehicle passengers. However, it is also quite possible to allow the rail to extend at least sectionwise at an inclination in order to permit an adaptation to different positions of the vehicle seat.

An installation of the aforementioned type is disclosed in the German Offenlegungsschrift 30 18 442, in which the detent element 13 is rigidly connected with the handle 12. For purposes of adjusting the slide member 11, the handle 12 is pressed in from the side (i.e., in a direction perpendicular to the displacement direction) against the force of a prestress spring 23 until the detent element becomes disengaged from the detent aperture 10 of the rail 4. The handle is released again at the latest after reaching the desired new detent position whereupon the detent element engages into the detent aperture of the rail under the force of the aforementioned prestress spring. The actuating force is, therefore, exactly as large as the prestress force acting on the detent element.

An adjusting installation of a corresponding construction is disclosed in the German Offenlegungsschrift 30 18 309, which, however, is utilized in conjunction with a passive safety belt actuating installation. The slide member which is again adjustable in height, is provided in this case with a locking mechanism which during the automatic fastening of the safety belt fixes a safety belt entrainment member, forming the hinge point, at the slide member and during the automatic unfastening of the belt again releases the safety belt entrainment member. For purposes of height adjustment of the slide member 22, an actuating member 56 rigidly connected in this case with a detent element is moved away from the rail against the force of the prestress spring 70 until the detent element becomes disengaged from the corresponding detent aperture 44 of the rail.

The principal object of the present invention resides in providing an installation of the aforementioned type which, together with a simple construction, offers an increased prestress force on the detent element for increasing the safety against unintentional adjustment and nonetheless is easily adjustable.

The underlying problems are solved according to the present invention in that the detent element and the manual actuating element are displaceable in different directions and are coupled with one another by way of a reduction or step-down guide element. By reason of the step-down in the displacement (displacement distance of the actuating member is larger than displacement distance of the detent element), a corresponding force transmission results so that an unchanged actuating force for the actuating member which is determined by the spring prestress, leads to a correspondingly greater prestress force for the detent element. This increased prestress force reduces the danger that after an adjustment is made, the detent element will not engage completely in the detent aperture, for example, because the detent mechanism has become relatively tight by reason of soiling. Owing to the different movement directions of detent element and of the manual actuating member (movement in opposite directions or movement in different spatial directions), only a guide element is necessary for coupling the detent element and manual actuating member which at the same time takes care for the step-down translation.

According to another feature of the present invention, a particularly simple construction is realized which is additionally mechanically sturdy and operates reliably, if a guide member is provided that is pivotally connected both with the detent element as also, with the actuating member at another location.

The manual actuating member and detent element may be movable perpendicularly relatively to one another. The movement direction of the detent element thereby lies generally in a plane perpendicular to the longitudinal direction of the rail in order to avoid that in case of a load on the belt, adjusting forces are exerted on the detent element.

In a particularly preferred embodiment of the present invention the actuating member is movable in a direction parallel to the displacement movement of the slide member since in that case the force direction for the actuation of the manual actuating member coincides in an ergonomically favorable manner with the force direction for the displacement of the slide member.

With a guide member pivotally connected exclusively at the detent element and at the manual actuating member, the displacement paths of the detent element and of the actuating member follow simple trigonometric functions which permits a simple determination of the reduction or step-down ratio. A particularly favorable reduction ratio results if the two points of pivotal connection in the detent position of the detent mechanism lie on a straight line which is approximately parallel to the displacement direction of the detent element or subtends therewith an angle smaller than 25°, preferably smaller than 20°. On the other hand, the straight line subtends in the release position of the detent mechanism an angle with the displacement direction of the detent element which is between about 30° to about 50°, preferably between about 35° to about 45°.

A particularly high mechanical stability can be achieved according to the present invention if at least one of the two points of pivotal connection is formed by a pivot bolt which is guided at least on one side in a guide slot of the slide member.

According to still another feature of the present invention, a simple construction of the actuating member is assured in that the actuating member includes an essentially plate shaped main section which is disposed in a plane parallel to the movement directions of the actuating member and of the detent element, in that the guide member is pivotally supported at the plate-shaped main section about an axis essentially perpendicular to the plane of the plate, and in that the actuating member includes a manual actuating section bent at right angle to the main section, whereby a manual actuating abutment rigidly secured at the slide member is disposed opposite to the manual actuating section in the direction of the adjusting movement of the handle in the sense of a release of the detent mechanism.

The prestressed spring, preferably in the form of a coil spring, is preferably arranged between the actuating member and the abutment. Since sufficient space is present thereat for the prestressed spring and also a relatively large spring travel is available, a simple compression coil spring can be used as the prestress spring.

If the rail is formed by a profile approximately U-shaped in cross-section, preferably approximately trapezoidally shaped in cross-section, whose profile edges are bent back inwardly approximately U-shaped, the rail will exhibit high rigidity combined with a simultaneous narrow construction. The rail according to the present invention can also be bent in the longitudinal direction in order to adapt the same to the body shape, especially to the shape of a B column. The inwardly bent-back profile edges increase the rigidity of the rail and may serve simultaneously as guidance for the correspondingly bent longitudinal edges at the base plate of the slide member.

According to still another feature of the present invention, the detent apertures are provided in least at one of the profile edges, preferably in the form of apertures in the bent-back leg of the U-shape of the edge. In that case, the detent apertures can be manufactured in a cost-favorable manner and lead to an only slight weakening of the rail profile.

According to still a further feature of the present invention, the slide member is provided with slide elements which are disposed opposite the bent-back longitudinal edges of the base plate at a distance therefrom in order to hold in this manner the profile edges between the slide element and the bent-back longitudinal edges. This will result in a low friction guidance of the slide member at the rail.

In order to prevent that the slide member might possibly slide out of one of the two ends of the rail during the adjustment of a new belt-fastening height, the present invention provides a closure cap which at the same time serves as search-assist when locating the upper and lower belt position and additionally assures centering of the guide profile inside of the rail.

The fastening places for the rail in different types of motor vehicles are generally also arranged in a different manner. In order to be able to adapt the same to different fastening conditions without any significant constructive changes in the adjusting installation, a separate fastening member is proposed according to the present invention which is rigidly connected with the rail, for example, by welding or riveting. The rail, properly speaking, may then be the same for different types of vehicles whereby only the fastening member of correspondingly matched construction has to be used.

These and other objects, features and advantages of the present invention will become more apparent from the following description when taken in connection with the accompanying drawing which shows, for purposes of illustration only, one embodiment in accordance with the present invention, and wherein FIG. 1 is a simplified side elevational view, partially in cross-section, of one embodiment of an adjusting installation of a hinge point of a vehicle safety belt in accordance with the present invention.

FIG. 2 is a transverse cross-sectional view taken along line II—II of FIG. 1.

FIG. 3 is a plan view on the installation of FIG. 1 taken in the direction of arrow III.

FIG. 4 is a side elevational view, partly in cross-section, of a slide member of the installation according to FIG. 1, the cross-section being taken along line IV—IV of FIG. 6.

FIG. 5 is a partial cross-sectional view of the slide member according to FIG. 4 taken along line V—V of FIG. 6.

FIG. 6 is a top plan view on the slide member according to FIG. 4 taken in the direction of arrow VI.

FIG. 7 is a bottom plan view of the slide member of FIG. 6 and

FIG. 8 is a diagram illustrating the geometric relationship in the motion step-down of the present invention.

Referring now to the drawing wherein like reference numerals are used throughout the various views to designate like parts, the adjusting installation generally designated by reference numeral 10 according to FIGS. 1 to 3 is part of a passive safety belt actuating installation not illustrated in further details. As explained, for example, in the German Offenlegungsschrift 29 42 207, such an actuating installation consists of an entrainment member 12 which is mounted at a tension and compression-rigid force-transmitting member 16 (indicated in dashed lines in FIG. 1) by way of a connecting member 14 schematically indicated in FIG. 2. The force-transmitting member 16 extends inside of a guide profile 18 indicated in FIGS. 1 and 2 in dash and dotted lines and is driven by a motor drive arranged at one of the two ends of the guide profile for the longitudinal displacement along the profile 18. The entrainment member 12 serves as hinge point of the belt, which is indicated in FIG. 1 by the entrainment slot 12a of the entrainment member 12, through which the safety belt (not shown) can be extended. The entrainment member 12 is displaceable from a boarding position into a belt-fastening position. In its belt-fastening position shown in FIG. 1, the entrainment member 12 is disposed within the adjusting installation 10 according to the present invention, whereby it is fixed at a slide member generally designated by reference numeral 20 to be described in detail hereinafter by reference to FIGS. 2 to 7.

The type and manner of the locking and unlocking of the entrainment member 12 at the slide member 20 is described more fully in the German Offenlengungsschrift 29 42 207 as to its principle of operation so that reference can be had to this printed publication concerning the operation thereof. For purposes of the present invention, it should only be mentioned that a detent lever generally designated by reference numeral 22 (FIG. 7) which is provided at the bottom side of the slide member 20, engages from behind an entrainment neck portion 12b (FIG. 1) which in the belt-fastening position of the entrainment member 12 has entered into an inlet opening 24 of the slide member 20, so that the neck portion 12b is fixed at the entrainment member 12. The detent lever 22 is pivotally secured at a base plate 40 of the slide member 20 provided with the inlet opening 24 by way of a pivot bolt 22a and is prestressed into its detent position according to FIGS. 6 and 7, with the aid of a fastening spring 22b. A cam 22c provided at the bottom side of the detent lever 22 serves for the disengagement of the detent mechanism, for which purpose it cooperates with an unlocking nub (not shown) movably arranged at the force-transmitting member 16 with respect to the entrainment neck 12b (according to German Offenlengungsschrift 29 42 207).

In the belt-fastening position a microswitch 26 which is arranged at the top side of the base plate, is actuated by a projection 12c of the entrainment member 12.

The safety belt hinge point which is constructed adjustable in height with the aid of the adjusting installation according to the present invention, however, may also form, differing from the illustrated embodiment, the fixed, shoulder-high hinge point of a conventional safety belt to be fastened by the vehicle passenger himself.

The slide member 20 is displaceable along a rail generally designated by reference numeral 30 whose cross-sectional profile can be seen from FIG. 2. The rail 30 is formed by an approximately U-shaped sheet metal profile whereby the profile edges 30a are bent inwardly and back approximately U-shaped. A trapezoid forms approximately the U-shape, whose narrower parallel side forms the center leg of the U-shape and whose inclined sides form the side legs 30c of the U-shape. Accordingly, the profile is open at the wide parallel side which is disposed opposite the narrow parallel side (center leg 30b). The advantage of this described profile shape resides above all in that the mechanical stability of the profile is very high together with compact cross-sectional dimensions and in that the possibility exists nonetheless to bend the rail 30 in adaptation to the body, especially to the D-column of the vehicle which is provided for the most part for its fastening. As shown in FIGS. 1 to 3, closure caps 32 are provided at both ends of the rail 30 which are fixed at the rail 30, for example, by means of detent cams or lugs 32a, indicated at the bottom of FIG. 1, which engage in corresponding detent apertures 30d in the side legs 30c of the rail 30. The closure caps 32 are provided on the inside of the rail with an aperture 32b matched to the cross-section of the guide profile 18 for the force transmitting element 16. This serves for the fastening of the guide profile 18 inside of the rail 30. It can be seen from FIG. 3 that the closure cap 32 extends up to one of the two profile edges 30a and covers the same so that the closure cap 32 also serves as movement stop for the slide member 20 guided along the profile edges 30a.

A plate-like fastening member generally designated by reference numeral 34 which extends through the rail 30 in the longitudinal direction A of the rail and abuts at the inside of one of the two lateral legs 30c, serves for the purpose of fastening the rail 30 and therewith of the adjusting installation 10 at the motor vehicle. The two ends of the fastening member 34 project beyond the two rail ends and are provided each with a fastening opening 34a for the mounting at the B column of the motor vehicle. As illustrated in FIG. 3, the ends, for purposes of achieving the mechanical stability, are embossed and cranked in such a manner that they terminate flush with the outside of the rail. The fastening member 34 is welded together with the rail 30 in a manner not illustrated; however, the member 34 may also be riveted together with the rail 30.

The slide member 20 is displaceable along the rail 30 (direction A in FIG. 1) and is adapted to be fixed at the rail 30 in several detent positions (in the illustrated embodiment in three detent positions); this is done in order to adapt the belt hinge point, i.e., the belt-fastening position of the entrainment member 12 engaged in the slide member 20, to the respective body height of the vehicle user in order to retain the body in the seating position in case the vehicle rolls over. The slide member 20 is provided for that purpose with a detent element generally designated by reference numeral 36 which engages in the respective detent position in a corresponding detent aperture 38 of the rail 30. As shown in FIGS. 1 to 3, the respective detent aperture 38 is established by milling out a section of the bent-back leg 30a' of one of the two profile edges 30a.

The detent element 36 in the form of a small plate having a rectangular configuration, is located on top of the base plate 40 of the slide member 20. The base plate 40 is constructed elongated in the longitudinal direction A of the rail 30.

The two longitudinal edges 40a of the base plate 40 are bent upwardly at right angle in FIG. 2 for the engagement into the U-shape of the two profile edges 30a of the rail 30 and are provided with a plastic covering 40b, illustrated only in FIG. 2, for the reduction of the friction between the longitudinal edges 40 and the inside of the edges 30a. By reason of this mutual abutment of rail 30 and base plate 40 over a relatively large area, a small specific surface pressure and therewith a relatively low wear will result.

In order to retain the bent longitudinal edges 40a inside the profile edges 30a, slide elements 42 (FIGS. 1 and 2) are provided on the slide member 20 along the outside of the profiled edges, which are disposed opposite the longitudinal edges 40a, and more particularly in the shape of plastic caps which are mounted over the longitudinal edges, disposed parallel to the direction A, of a counterplate 44a disposed parallel to the base plate 40. The counterplate 44a is a part of an abutment generally designated by reference numeral 44 (FIGS. 4 and 5) which, in addition to this plate 44a, includes an abutment section 44b bent at right angle to the plate 44a away from the base plate 40, on which an actuating knob portion 46 is mounted.

The abutment 44 is mounted on the base plate 40 at a distance thereto by way of a fastening member 48 (FIGS. 4 and 5). The fastening member 48 is formed by a sheet metal part bent essentially U-shaped, whereby the center leg 48a of the U-shape abuts flat at the bottom side of the plate 44a and is for example, spot-welded thereto, and whereby the side legs 48b of the U-shape extend perpendicularly toward the base plate 40, project with their free ends through corresponding apertures of the base plate 40 and for the purpose of rigid fastening at the base plate 40, are bent over toward the bottom side in the area thereof projecting beyond the bottom side.

In order to be able to disengage the detent element 36 from the respective detent aperture 38 for purposes of adjusting the slide member 20, a manual actuating member generally designated by reference numeral 50 in the form of a knob or button (FIGS. 1 and 4) is supported at the base plate 40 displaceable in the direction A; the actuating member 50 is thereby coupled with the detent element 36 by way of a guide member 52. The guide member 52 serves as movement guidance since the detent element 36 is supported displaceable in a direction B in parallel to the base plate plane (FIG. 2) perpendicular to the movement direction A of the actuating member 50. The guide member 52 additionally takes care for a reduction or step-down of the movement transmission from the actuating member 50 to the detent element 36 as will be described more fully hereinafter.

The actuating member 50 is shaped similarly as the abutment 44 and accordingly consists of a plate-shaped main section 50a (FIGS. 4 and 5) parallel to the base plate 40 as well as of a manual actuating section 50b (FIG. 4) bent at right angle away from the base plate 40, on which an actuating knob 53 is again mounted. The actuating knob 53 is disposed opposite in the direction A to the already mentioned actuating knob 46 of the abutment 44 and engages thereby in a recess 46a of the knob portion 46. The recess 46a is so dimensioned that the knob-like portion 53 can penetrate further into the recess 46a, and more particularly when the two knob-like portions 46 and 53 are manually pressed together for the disengagement of the detent mechanism against the force of a coil spring 54 acting between the two portions 46 and 53. The coil spring 54 is supported directly at the sections 44b and 50b bent at right angles whereby for purposes of centering the spring a collar 56 of each of the sections 44b and 50b is bent over toward the inside of the coil spring as can be seen in FIGS. 4 and 6.

The aforementioned main section 50a (FIGS. 4 and 5) of the actuating member 50 is provided with openings 50c, through which extend the legs 48b of the fastening element 48; the openings 50c are constructed elongated in the direction A in such a manner that the actuating member 50 can be displaced toward the left in FIGS. 4 to 7 in the direction A (FIG. 1) by a distance $\Delta x$. The main section 50a is fitted in-between the detent element 36 and the guide member 52. For the further improvement of the guidance of the manual actuating member 50, the latter abuts at the top side of the base plate 40 by way of a corresponding downwardly curved embossment in the end area between the main section 50a and the manual actuating section 50b.

In order to reliably guide the detent element 36 displaceable linearly along the base plate 40 in the direction B (FIG. 2), also under mechanical loads, the detent element 36 includes a slide member 36a inserted into a slot 57 (FIGS. 4 and 7) of the base plate 40. The length of the slot 57 exceeds the length of the slide member 36a by $\Delta y$ (FIG. 7), by means of which is determined the displacement motion of the detent element 36 during the movement from the detent position with engagement into the corresponding detent aperture into the release position out of engagement with the detent aperture.

The connecting guide member 52 is pivotally connected both at the detent element 36 (pivot bolt 36b fixed at the detent element) as also at the main section 50a of the actuating member 50 (pivot bolt 52a in FIGS. 5 and 6). The two pivot bolts 36b and 52a are extended so far in the direction away from the base plate 40 that they engage each in a template slot 60 respectively 62 (FIG. 6) provided in the plate 44a of the abutment 44. The pivot bolt 36b respectively 52a is again displaceable inside of the respective slot 60 respectively 62 by $\Delta x$ in the direction A respectively $\Delta y$ in the direction B. Since both pivot bolts are connected with the guide member 52, they move necessarily in unison. This is explained by reference to FIGS. 6 to 8. The point of intersection of the axis of the pivot bolt 36 with the plane of the drawing is indicated therein by reference character C and the point of intersection of the axis of the pivot bolt 52a also with the plane of the drawing is indicated by reference character D. If for purposes of disengagement of the detent mechanism the two head portions 46 and 53 are pressed together, then the actuating member 50 moves relative to the base plate 40 toward the left in FIGS. 4 to 6, while taking along the pivot bolt 36b. The pivot bolt 52a is forcibly taken along by way of the guide member 52 and is displaced in the direction B from the coordinated detent aperture 38. A smaller movement distance ($\Delta y$) of the detent element in the direction B corresponds to a maximum movement distance of the actuating member 50 in the direction A ($\Delta x$). FIG. 8 illustrates the geometric relationships whereby the x-y coordinate system is placed in the point C. In the detent position illustrated in FIGS. 1 through 7 with engagement of the detent element 36 in the respective detent aperture 38, the angle between the direction B and the straight connecting line between the points C and D amounts to $\alpha_1$. With pressed together head portions 46 and 53 and corresponding displacement of the actuating member 50 and detent element 36 in the opposite end position this angle now becomes a larger angle $\alpha_2$ (corresponding to the new position D' of the axis of the pivot bolt 52a in the x-y coordinate system). In that case the following relationship is valid for the two displacement distances $\Delta x$ and $\Delta y$:

$$\Delta y : \Delta y = \frac{\sin \alpha_2 - \sin \alpha_1}{\cos \alpha_1 - \cos \alpha_2}.$$

By a corresponding selection of $\alpha_1$ and $\alpha_2$ a desired translation ratio $\Delta x$ to $\Delta y$ can be achieved. The angle $\alpha_1$ amounts preferably to about 15° and the angle $\alpha_2$ amounts to about 40°.

Since $\Delta x$ is larger than $\Delta y$ also the force acting from the prestress spring 54 by way of the actuating member 50 and the guide member 52 on the detent element 36, which prestresses the detent element 36 in the direction B for the engagement in the respective detent aperture 38, is correspondingly larger than the force exerted by the prestress spring 54 on the two knob-like head portions 46 and 53 which has to be overcome during the manual actuation. This high detent element-prestress force increases the safety of the detent mechanism against unintentional adjustment; nevertheless an adjustment without great force application is possible by reason of the relatively low actuating force. The described arrangement according to the present invention is ergonomically favorable since during the compression of the head portions 46 and 53 the respective moments will cancel out and the actuating force direction coincides with the adjusting direction (A) of the slide member 20.

Consequently, for adjusting the slide member 20, initially only the two head portions 46 and 53 have to be moved toward one another, subsequently the slide member has to be displaced into the new detent position and the pressure on the head portion has to be removed at the latest at that point so that the detent element again moves into the detent position with engagement into the new detent aperture under the return force of the prestress spring 54.

As already mentioned, the rail 30 can be constructed bent corresponding to the spatial conditions which exist. Depending on the manner of bending, the longitudinal edges of the base plate 40 are then constructed correspondingly curved or the base plate 40 has to be bent as such.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

We claim:

1. An installation for the adjustment of a hinge point of a safety belt in a vehicle, comprising rail means fixed at the vehicle, slide means displaceable along said rail means and determining the hinge point, detent means selectively securing the slide means at the rail means in at least two detent positions, said detent means including a detent element displaceably supported at the slide means between a detent position with engagement into a detent aperture provided in the rail means and coordinated to the respective detent position and a release position out of engagement with the detent aperture, spring means for prestressing the detent element into the detent position, manual actuating means operatively connected with the detent element for moving the detent element into the disengaging position, said detent element and said manual actuating means being displaceable in different directions, and guide means providing a motion step-down for coupling the detent element and the manual actuating means with each other.

2. An installation according to claim 1, wherein said guide means includes a guide member pivotally connected with the detent element and, with the manual actuating means at another location.

3. An installation according to claim 2, wherein said guide member is pivotally connected exclusively at the detent element and at the manual actuating means.

4. An installation according to claim 2, wherein the manual actuating means and the detent element are movable at the slide means in mutually substantially perpendicular directions.

5. An installation according to claim 4, wherein said manual actuating means and detent element are displaceable substantially linearly.

6. An installation according to claim 4, wherein the two points of pivotal connection in the detent position of the detent means are located on a straight line which extends at most at a relatively small angle to the displacement direction of the detent element.

7. An installation according to claim 6, wherein said straight line subtends an angle with the displacement direction of the detent element which is smaller than 25°.

8. An installation according to claim 6, wherein said straight line extends approximately parallel to the displacement direction of the detent element.

9. An installation according to claim 7, wherein said angle is smaller than 20°.

10. An installation according to claim 9, wherein said angle is about 15°.

11. An installation according to claim 6, wherein the straight line in the release position of the detent means subtends an angle with the displacement direction of the detent element of about 30° to about 50°.

12. An installation according to claim 11, wherein said last-mentioned angle is about 35° to about 45°.

13. An installation according to claim 12, wherein said last-mentioned angle is about 40°.

14. An installation according to claim 7, wherein the straight line in the release position of the detent means subtends an angle with the displacement direction of the detent element of about 30° to about 50°.

15. An installation according to claim 14, wherein the manual actuating means is displaced in a direction substantially parallel to the displacement direction of the slide means.

16. An installation according to claim 15, wherein at least one of the two points of pivotal connection is formed by a pivot which is guided at least on one side in a guide slot of the slide means.

17. An installation according to claim 16, wherein said detent element includes a slide member inserted into a slot of the slide means.

18. An installation according to claim 14, wherein the actuating means includes an essentially plate-shaped main section which is disposed in a plane substantially parallel to the movement directions of the actuating means and detent element, said guide means being pivotally supported at said main section about an axis disposed essentially perpendicular to the plane of the plate.

19. An installation according to claim 18, wherein the actuating means includes a manual actuating section bent substantially at right angle from the main section and actuating abutment means fixedly secured at the slide means and disposed opposite the actuating section in the direction of the adjusting movement of the actuating means in the sense of a disengagement of the detent means.

20. An installation according to claim 19, wherein said prestressed spring means engages at the actuating means as well as at the slide means.

21. An installation according to claim 20, wherein the rail means is formed by an approximately U-shaped profile whose profile edges are bent back inwardly approximately U-shaped.

22. An installation according to claim 21, wherein the slide means includes a base plate whose longitudinal edges disposed substantially parallel to the rail longitudinal direction are bent for engagement into the U-shape of the two profile edges.

23. An installation according to claim 22, wherein the slide means includes slide elements which are disposed to and at a distance from the bent-back longitudinal edges of the base plate in order to thus retain between themselves and the bent-back longitudinal edges the profile edges.

24. An installation according to claim 2, wherein at least one of the two points of pivotal connection is formed by a pivot bolt which is guided at least on one side in a guide slot of the slide means.

25. An installation according to claim 24, wherein said detent element includes a slide member inserted into a slot of the slide means.

26. An installation according to claim 2, wherein the actuating means includes an essentially plate-shaped main section which is disposed in a plane substantially parallel to the movement direction of actuating means and detent element, said guide means being pivotally supported at said main section about an axis disposed essentially perpendicular to the plane of the plate.

27. An installation according to claim 26, wherein the actuating means includes a manual actuating section bent substantially at right angle from the main section and actuating abutment means fixedly secured at the slide means and disposed opposite the actuating section in the direction of the adjusting movement of the actuating means in the sense of a disengagement of the detent means.

28. An installation according to claim 1, wherein said prestressed spring means engages at the actuating means as well as at the slide means.

29. An installation according to claim 28, wherein said spring means is a coil compression spring engaging at the manual actuating section of the actuating means as well as at an actuating abutment means.

30. An installation according to claim 1, wherein the rail means is formed by an approximately U-shaped profile whose profile edges are bent back inwardly approximately U-shaped.

31. An installation according to claim 30, wherein said profile is essentially trapezoidally shaped.

32. An installation according to claim 31, wherein the detent apertures are provided at least in one of the two profile edges.

33. An installation according to claim 32, wherein said detent apertures are in the form of apertures in the bent-back leg of the U-shape of the edge.

34. An installation according to claim 30, wherein the slide means includes a base plate whose longitudinal edges disposed substantially parallel to the rail longitudinal direction are bent for engagement into the U-shape of the two profile edges.

35. An installation according to claim 34, wherein the slide means includes slide elements which are disposed to and at a distance from the bent-back longitudinal edges of the base plate in order to thus retain between themselves and the bent-back longitudinal edges the profile edges.

36. An arrangement for adjusting a linking point of a seat belt in a vehicle, comprising: an elongated rail means fixed at the vehicle; slider means that can be slid along said rail; actuator means that is disposed at the slider so that the actuator means can be moved parallel to the longitudinal direction of the rail and can be actuated against the force of a spring; a locking element means movable along the longitudinal direction of the rail; said locking element means being slidable into locking positions by engaging in locking recesses in said rail; and wherein the locking element means is connected to the actuator means to be slid thereby via a guide means linkedly connected to the actuator means and the locking element means such that the guide means, in the locked position of the locking element means, forms an angle with the locking means that is smaller than 25°.

37. An arrangement according to claim 36, wherein the angle is about 15°.

38. An arrangement according to claim 37, wherein at least one of the two linked connections of the guide means is formed by a hinge pin that, at least on one side, is guided in a link slot of the slider means.

39. An arrangement according to claim 38, wherein at least one of the two linked connections of the guide means is formed by a hinge pin that, at least on one side, is guided in a link slot of the slider means.

40. An arrangement according to claim 39, wherein the locking element means has a projection that is slidable in a slot of the slider means.

41. An arrangement according to claim 40 wherein the spring normally applies its force to the actuator means to cause the actuator means, through the linked connection with the guide means, to slide the locking means into its locked position and wherein the actuator means can be operated against the force of the spring to cause the locking means to be withdrawn from the locked position by the guide means.

42. An arrangement according to claim 39 wherein the spring normally applies its force to the actuator means to cause the actuator means, through the linked connection with the guide means, to slide the locking means into its locked position and wherein the actuator means can be operated against the force of the spring to cause the locking means to be withdrawn from the locked position by the guide means.

43. An arrangement according to claim 38, wherein the locking element means has a projection that is slidable in a slot of the slider means.

44. An arrangement according to claim 43 wherein the spring normally applies its force to the actuator means to cause the actuator means, through the linked connection with the guide means, to slide the locking means into its locked position and wherein the actuator means can be operated against the force of the spring to cause the locking means to be withdrawn from the locked position by the guide means.

45. An arrangement according to claim 38 wherein the spring normally applies it force to the actuator means to cause the actuator means, through the linked connection with the guide means, to slide the locking means into its locked position and wherein the actuator means can be operated against the force of the spring to cause the locking means to be withdrawn from the locked position by the guide means.

46. An arrangement according to claim 37, wherein the locking element means has a projection that is slidable in a slot of the slider means.

47. An arrangement according to claim 46 wherein the spring normally applies its force to the actuator means to cause the actuator means, through the linked connection with the guide means, to slide the locking means into its locked position and wherein the actuator means can be operated against the force of the spring to cause the locking means to be withdrawn from the locked position by the guide means.

48. An arrangement according to claim 37 wherein the spring normally applies its force to the actuator means to cause the actuator means, through the linked connection with the guide means, to slide the locking means into its locked position and wherein the actuator means can be operated against the force of the spring to cause the locking means to be withdrawn from the locked position by the guide means.

49. An arrangement according to claim 36, wherein the locking element means has a projection that is slidable in a slot of the slider means.

50. An arrangement according to claim 49 wherein the spring normally applies its force to the actuator means to cause the actuator means, through the linked connection with the guide means, to slide the locking means into its locked position and wherein the actuator means can be operated against the force of the spring to cause the locking means to be withdrawn from the locked position by the guide means.

51. An arrangement according to claim 36 wherein the spring normally applies its force to the actuator means to cause the actuator means, through the linked connection with the guide means, to slide the locking means into its locked position and wherein the actuator means can be operated against the force of the spring to cause the locking means to be withdrawn from locked position by the guide means.

* * * * *